United States Patent
Peper et al.

(10) Patent No.: US 12,224,409 B2
(45) Date of Patent: *Feb. 11, 2025

(54) FURNITURE EFFICIENT BATTERY PACK

(71) Applicant: Era Nouveau, LLC, Redondo Beach, CA (US)

(72) Inventors: Thomas Justin Peper, Redondo Beach, CA (US); John S. Contreras, Redondo Beach, CA (US)

(73) Assignee: Era Nouveau, LLC, Redondo Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,503

(22) Filed: Feb. 13, 2023

(65) Prior Publication Data

US 2023/0198031 A1     Jun. 22, 2023

Related U.S. Application Data

(63) Continuation of application No. 16/777,789, filed on Jan. 30, 2020, now Pat. No. 11,605,838.

(60) Provisional application No. 62/799,028, filed on Jan. 30, 2019.

(51) Int. Cl.
| | |
|---|---|
| *H01M 10/42* | (2006.01) |
| *H01M 10/0565* | (2010.01) |
| *H01M 10/44* | (2006.01) |
| *H01M 10/48* | (2006.01) |
| *H01M 50/20* | (2021.01) |
| *A47C 1/024* | (2006.01) |
| *H01M 50/209* | (2021.01) |
| *H01M 50/224* | (2021.01) |
| *H01M 50/278* | (2021.01) |

(52) U.S. Cl.
CPC ..... *H01M 10/425* (2013.01); *H01M 10/0565* (2013.01); *H01M 10/44* (2013.01); *H01M 10/482* (2013.01); *H01M 50/20* (2021.01); *A47C 1/0242* (2013.01); *H01M 10/488* (2013.01); *H01M 50/209* (2021.01); *H01M 50/224* (2021.01); *H01M 50/278* (2021.01)

(58) Field of Classification Search
CPC .... A47C 1/0242; A47C 7/72; H01M 10/0565; H01M 10/425; H01M 10/44; H01M 10/441; H01M 10/482; H01M 10/488; H01M 2010/4271; H01M 2010/4278; H01M 2220/00; H01M 50/20; H01M 50/209; H01M 50/224; H01M 50/278; Y02E 60/10

See application file for complete search history.

(56) References Cited

U.S. PATENT DOCUMENTS

| | | | | |
|---|---|---|---|---|
| 5,747,965 | A * | 5/1998 | LaPointe | H01M 10/4257 320/135 |
| 2009/0284216 | A1* | 11/2009 | Bessa | H02J 7/0044 320/101 |

* cited by examiner

*Primary Examiner* — Victoria H Lynch
(74) *Attorney, Agent, or Firm* — Kwan & Olynick LLP

(57) ABSTRACT

A battery pack to be used in motorized furniture is provided. The battery pack includes a plurality of polymer cells. The plurality of polymer cells is connected such that a threshold voltage is achieved. The battery pack also includes a motherboard coupled to the plurality of polymer cells. The motherboard is configured to monitor and regulate each cell in the plurality of cells, as well as the entire plurality of cells as a whole. The motherboard is further configured to regulate power flow throughout the plurality of cells such that more than two motors may operate at the same time.

20 Claims, 9 Drawing Sheets

FURNITURE EFFICIENT BATTERY PACK

CROSS-REFERENCE TO RELATED APPLICATIONS

This application is a continuation of U.S. patent application Ser. No. 16/777,789 (BCHNP001), filed Jan. 30, 2020, and entitled, "FURNITURE EFFICIENT BATTERY PACK", which claims the benefit of priority under 35 U.S.C. § 119(e) to U.S. Provisional Application No. 62/799,028 (BCHNP001P), titled "FURNITURE EFFICIENT BATTERY PACK," filed Jan. 30, 2019, all of which are incorporated by reference in their entirety for all purposes.

TECHNICAL FIELD

The present disclosure relates generally to battery packs, more specifically to furniture-operating battery packs.

BACKGROUND

Traditionally, furniture has largely been immobile or manually operated. Only recently has furniture become motorized. However, motorized functions on furniture (eg. reclining) are often battery-operated. Unfortunately, furniture is built to utilize existing batteries, which are not designed specifically for the operation of motorized furniture and which present a variety of limitations.

In addition, because of the standard battery specifications, the ratio of the size of current batteries to the volume of stored power is not optimal for operating motorized furniture. In order to double the capacity, the standard battery would essentially be double the size. Further, standard battery packs are simple and low function, making usage, troubleshooting, and maintenance much more difficult. Thus, there exists a need for an improved battery system that is more user-friendly, can increase capacity without increasing the size impractically, and is adaptable to the designs and intended functions of motorized furniture.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

In general, certain embodiments of the present disclosure provide a battery pack and a motorized furniture system. The battery pack includes a plurality of polymer cells. The plurality of polymer cells is connected such that a threshold voltage is achieved. The battery pack also includes a motherboard coupled to the plurality of polymer cells. The motherboard is configured to monitor and regulate each cell in the plurality of cells, as well as the entire plurality of cells as a whole. The motherboard is further configured to alter the charging and discharging of each cell in the plurality of polymer cells individually such that all the cells in the plurality of polymer cells charge and discharge at the same rates.

In some embodiments, a second motherboard for connecting directly to the plurality of polymer cells, wherein the second motherboard is electrically connected to the motherboard. In some embodiments, the threshold voltage is 25.9 volts. In some embodiments, the plurality of polymer cells comprises exactly seven cells with a voltage of 3.7 volts each. In some embodiments, the plurality of cells and the motherboard are configured to operate two to six motors at the same time. In some embodiments, the battery pack further comprises an LED light configured to represent remaining power in the battery pack. In some embodiments, the battery pack further comprises a buzzer configured to notify a user that the battery level is 10% or less when the user activates the motor. In some embodiments, the motherboard includes a Bluetooth processor such that a user can turn off the battery output using a mobile device. In some embodiments, the battery pack is configured to be charged with a trickle charger. In some embodiments, the battery pack includes one of the following charge capacity to physical volume ratios: 1) 2000 milliampere hours (mAh) to 337.83 cm$^3$, 2) 4000 mAh to 459.77 cm$^3$, and 3) 6000 mAh to 605.22 cm$^3$.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present disclosure.

DETAILED DESCRIPTION OF PARTICULAR EMBODIMENTS

Figure 1A:
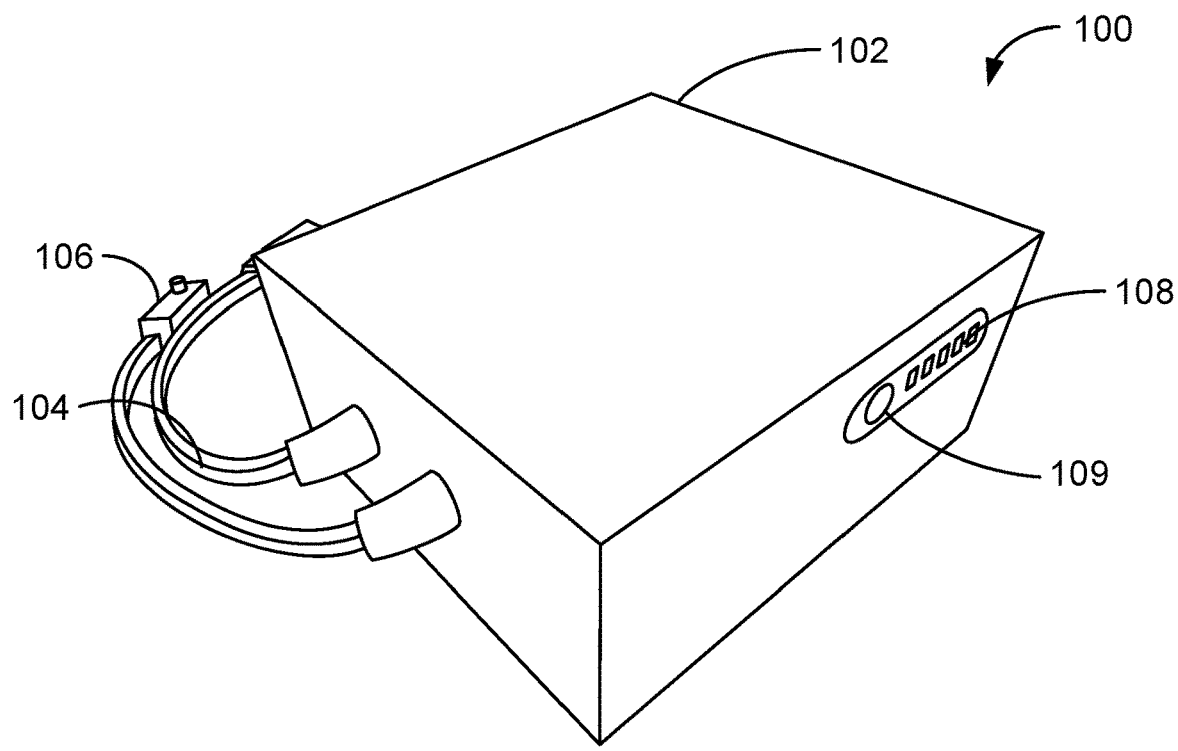
FIG. 1A illustrates one perspective view of an example battery pack, in accordance with some embodiments.

Reference will now be made in detail to some specific examples of the present disclosure including the best modes contemplated by the inventors for carrying out the present disclosure. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

For example, the techniques of the present disclosure may be described in the context of particular algorithms or formulas. However, it should be noted that the techniques of the present disclosure may apply to various other algorithms. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Current furniture battery packs are large, bulky, and tubular and on average host approximately 2.34 mAh per $cm^3$. With current technology, tubular battery cells have been used to create a larger capacity battery to store 2000 mAh, and 4000 mAh. However, the battery sizing was extremely large. For example, a 2000 mAh battery was 854.70 $cm^3$, a 4000 mAh battery was 1709.40 $cm^3$, and a 6000 mAh battery was 2564.10 $cm^3$. While using the current technology on the market to create a larger capacity battery, the issue of bogging down or stopping when engaged with more than one motor at a time continued. In addition, the size and shape of batteries necessary to operate many types of furniture are difficult to accommodate while maintaining the style and functionality of furniture designs.

Current batteries will not run devices with more than 2 motors and, as previously mentioned, usually bog down or stop completely when trying to run motors simultaneously. The performance of motorized furniture with current battery technology is therefore limited to focused operations and operations which may be regulated by 2 motors alone.

An alternative to tubular cells is polymer cells. This is because polymer cells have a greater power storage capacity ratio. For example, the size to volume of stored power ranges between 5.92 mAh per $cm^3$ (for 2000 mAh capacity), 8.70 mAh per $cm^3$ (for 4000 mAh), and 9.913 mAh per $cm^3$ (for 6000 mAh), which is 240%, 359%, 424% smaller than tubular cells for the same capacity. This reduction in size allows for storing inside most motorized furniture. However, simply ganging polymer cells together to generate the necessary 25.9 volts to operate furniture resulted in an extremely volatile battery pack. The cells would charge and discharge at different rates compromising the battery integrity and performance rendering the battery useless. Thus, the cells when ganged to form a pack needed to be regulated to insure even charging and discharging.

In addition, some current batteries have a single light showing the unit is powered but no indication of amount of charge remaining in battery. A lack of transparency in remaining battery life makes it difficult to determine when units need to be charged. Some batteries have a solution in a buzzer that will sound when the battery is getting low on power. However, these buzzers often sound at random with no interaction with the furniture. As a result, despite there being an indication of battery life, buzzers may not present an evident sign of battery failure. Thus, current batteries are not optimal in the operation of motorized furniture and actually limit the multi-functionality of devices.

According to various embodiments, the present disclosure provides a battery pack that is smaller, smarter, and can scale up in capacity without scaling up too much in size. In some embodiments, the battery pack comprises 7 polymer cells, a regulatory motherboard, a charging board, a buzzer, Bluetooth capability, and LED lights. The custom motherboard regulates the flow of power, and can allow up to 6 motors to be run simultaneously. The charging board stabilizes the polymer back and the motherboard ensures even charging and discharging of polymers, which prevents the device from becoming bogged down or stopping. In addition, the motherboard adds an additional safety feature to the operation of the battery pack. In case of charging and discharging outside of the safety guidelines, the motherboard also acts as a safety device by shutting down all functions of the battery pack due to atypical behavior.

According to various embodiments, four green LED lights and a fifth red LED light operate together as a scale indication of battery level remaining in the power pack. Once the battery life falls below 24% capacity, the red LED light will be lit during operation of the furniture. If the battery capacity drops below 10%, the red LED light will flash red when engaged.

Further, a buzzer which interacts with the furniture will sound at 10% capacity or below, indicating that the battery needs to be recharged. Each time the motor is engaged, the battery will sound until it is recharged.

EXAMPLE EMBODIMENTS

Figure 1B:
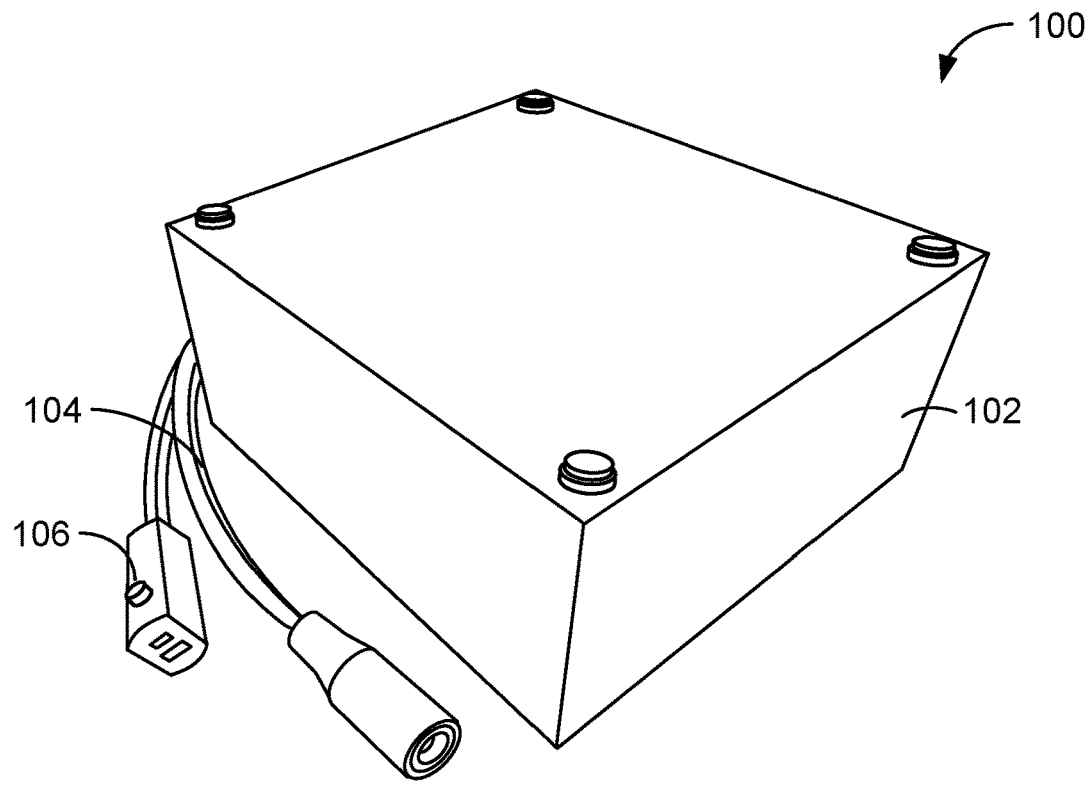
FIG. 1B illustrates another perspective view of an example battery pack, in accordance with some embodiments.

FIG. 1A illustrates a top perspective view of an example battery pack. Battery pack 100 includes an outer case, or body, 102, external LED display 108 with a power button 109, a charging cable 104 (input), and an output cable 106. In some embodiments, outer case 102 comprises a high density, heat resistant plastic. In some embodiments, power button 109, when pushed, causes LED lights 108 to display how much battery life is left. FIG. 1B illustrates a bottom perspective view of battery pack 100.

Figure 1C:
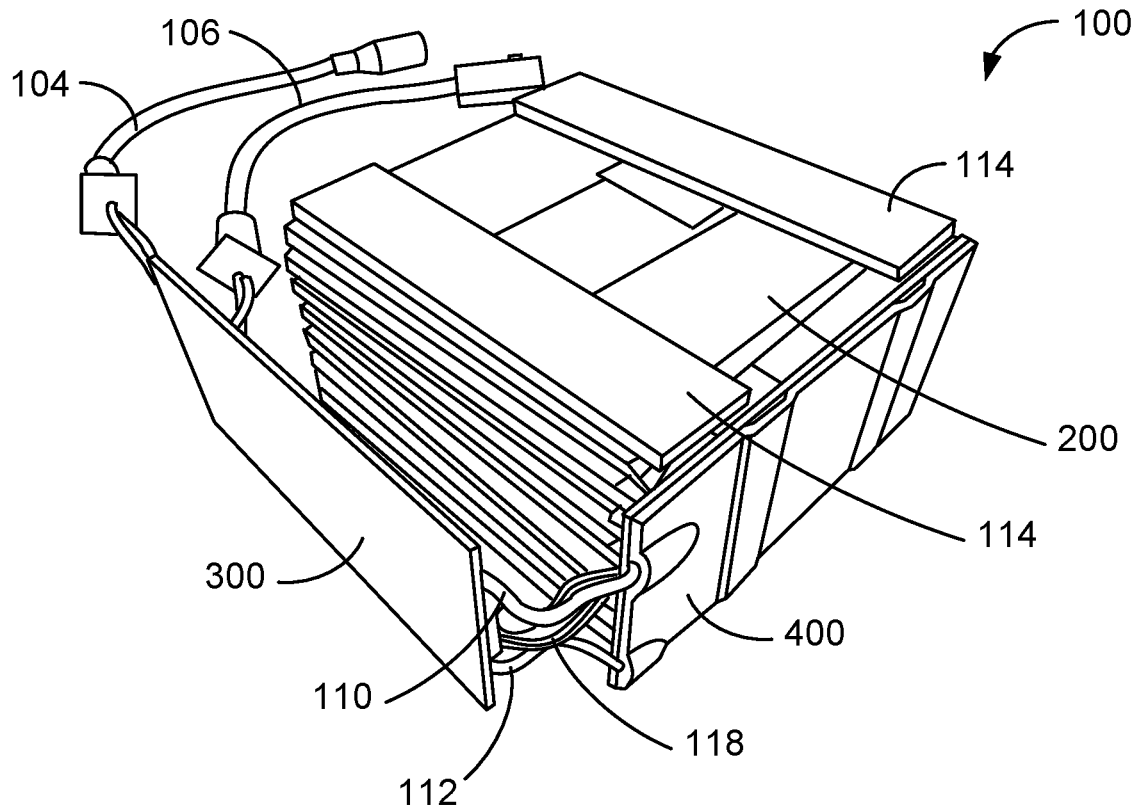
FIG. 1C illustrates one perspective view of an example battery pack with the outside casing removed, in accordance with some embodiments.

FIG. 1C illustrates a top perspective view of battery pack 100 with the outside casing removed. Inside outer case 102 is a plurality of polymer cells 200. In some embodiments, the plurality includes exactly seven cells with a voltage of 3.7 volts each. This is because the total plurality of cells 200 needs to have a total voltage of 25.9 volts in order to operate industry standard motorized furniture. In some embodiments, charging motherboard 400 directly connects each cell in the plurality of cells 200. Charging motherboard 400 is described in more detail with respect to FIGS. 4A-4B below. Charging motherboard 400 is connected to regulating motherboard 300 via positive current wire 110, negative current wire 112, and a plurality of cell wires 118. In some embodiments, the plurality of cell wires 118 comprises seven wires corresponding to each of the seven cells in the plurality of cells 200. Motherboard 300 connects to charging cable 104 and output cable 106. Motherboard 300 is described in more detail below with respect to FIGS. 3A-3B.

Figure 1D:
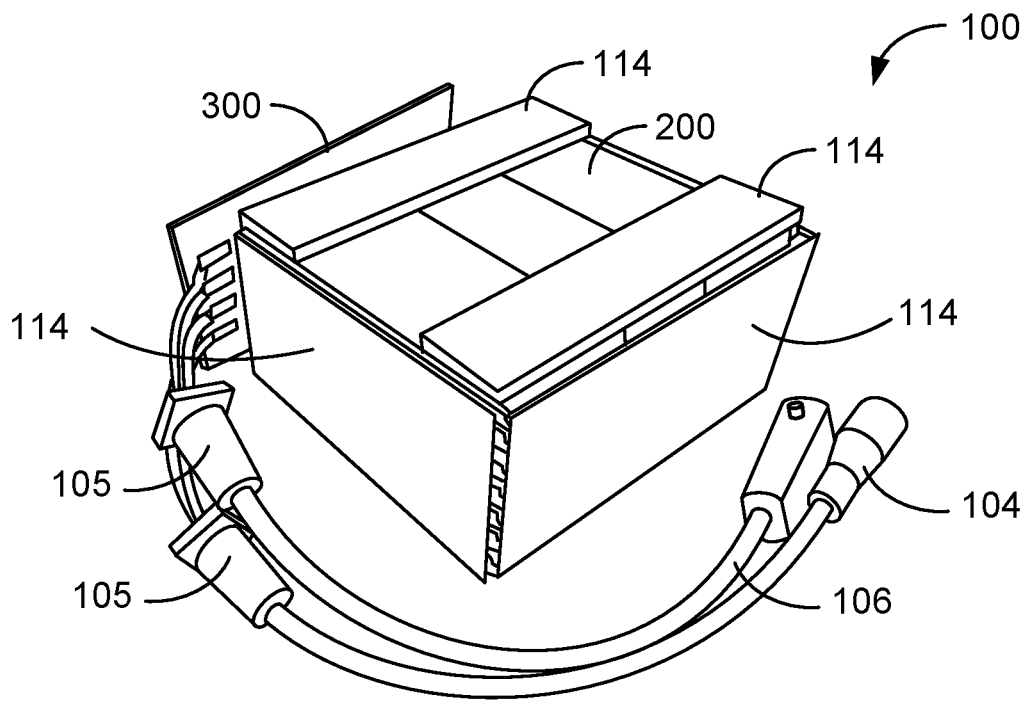
FIG. 1D illustrates another perspective view of an example battery pack with the outside casing removed, in accordance with some embodiments.

In some embodiments, the cells 200 are protected from direct contact with outer casing 102 via protector 114. In some embodiments, protector 114 comprises a high density foam with a double side adhesive. The high density foam protects against impact and the adhesive keeps the cells from shifting around in the box, thereby reducing the risk of breaking connections and becoming a fire hazard. As can be seen in FIG. 1D, protector 114 is located on each side of battery pack 100 that can be exposed to out casing 102. In some embodiments, the top and bottom sides of battery pack 100 each have two protectors 114. However, in other embodiments, protector 114 on the top and bottom sides can comprise one large high density foam piece that covers the cell completely. In some embodiments, foam protector 114 is also attached to the back of one or both motherboards to further protect the motherboards and cells from impacting outer casing 102 directly.

In some embodiments, charging cable 104 and output cable 106 are attached to outer casing 102 via stoppers 105. Stoppers 105 serve to hold the cables in place securely and also help provide further insulation to the wires within the cables from outside elements. FIG. 1D illustrates a bottom perspective view of battery pack 100.

Figure 1E:
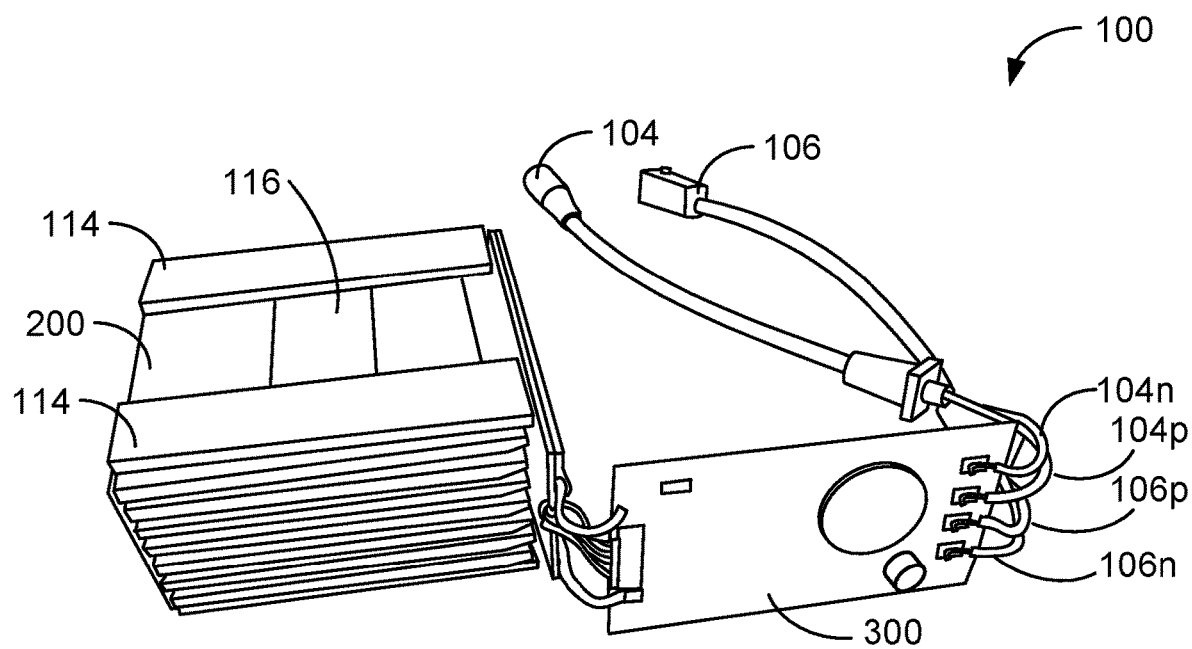
FIG. 1E illustrates yet another perspective view of an example battery pack with the outside casing removed, in accordance with some embodiments.

FIG. 1E illustrates yet another perspective view of battery pack 100, with mother board 300 peeled back to expose the other side of the motherboard. Peeling back motherboard 300 also exposes the connection points to inside wire pairs 104n and 104p, and 106p and 106n, located in charging cables 104 and 106, respectively. Inside wires 104n and 106n are negative current wires. Inside wires 104p and 106p are positive current wires.

In some embodiments, the plurality of cells 200 is bound together via static free tape 116. Tape 116 binds the cells together to prevent individual cells from moving and reducing the possibility of a cell breaking off from the charging motherboard 400 and creating fire hazard. In some embodiments, tape 116 needs to be free of metal or conductor material and must be static free. In some embodiments, tape 116 can be Kapton tape.

Figure 2A:
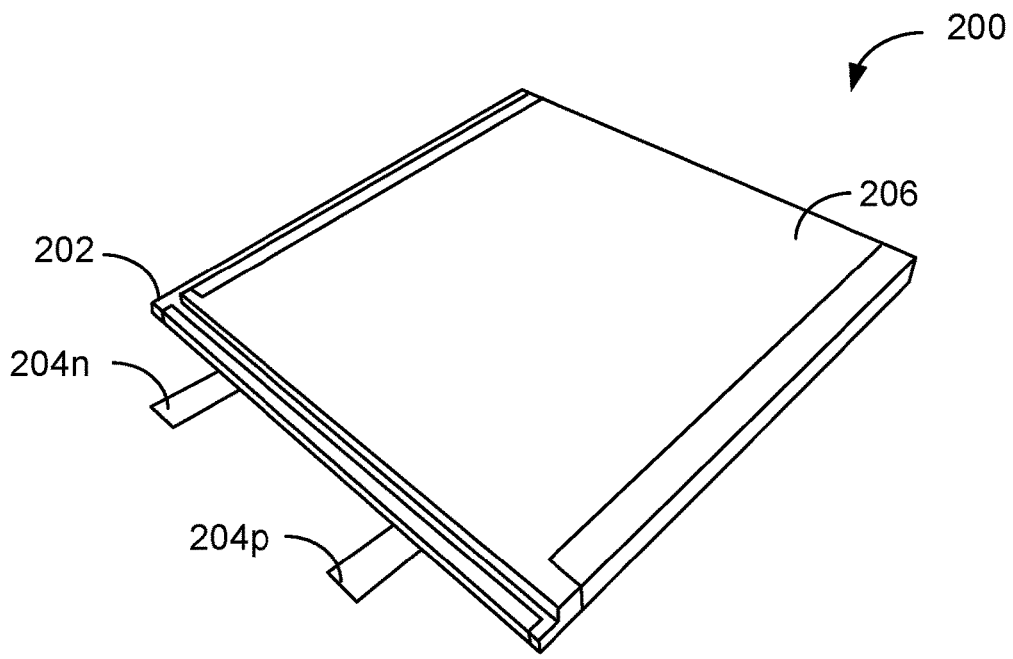
FIG. 2A illustrates one perspective view of an example battery cell, in accordance with some embodiments.
Figure 2B:
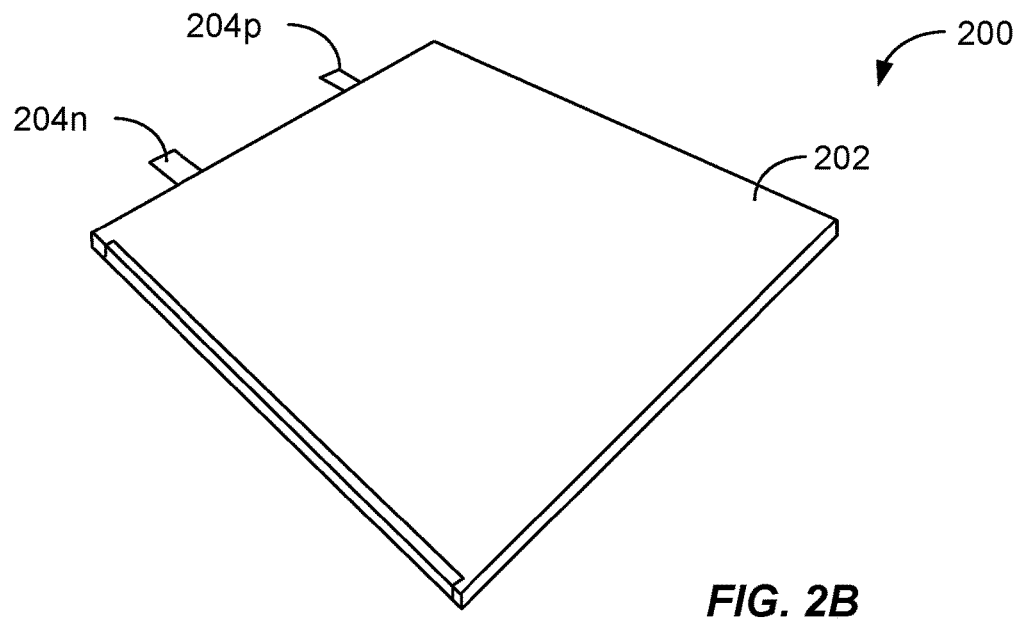
FIG. 2B illustrates another perspective view of an example battery cell, in accordance with some embodiments.

FIG. 2A illustrates a top perspective view of battery cell 200. In some embodiments, cell 200 comprises a substantially square outer case 202. In some embodiments, outer case 202 is made of aluminum or some other kind of metal. However, since aluminum is not very sturdy, in some embodiments, cell 200 also includes a plastic protective covering 206 that surrounds aluminum case 202. Each cell 200 includes a positive pole 204p and a negative pole 204n which will be inserted into corresponding slots on charging motherboard 400. FIG. 2B illustrates a bottom perspective view of cell 200.

Figure 3A:
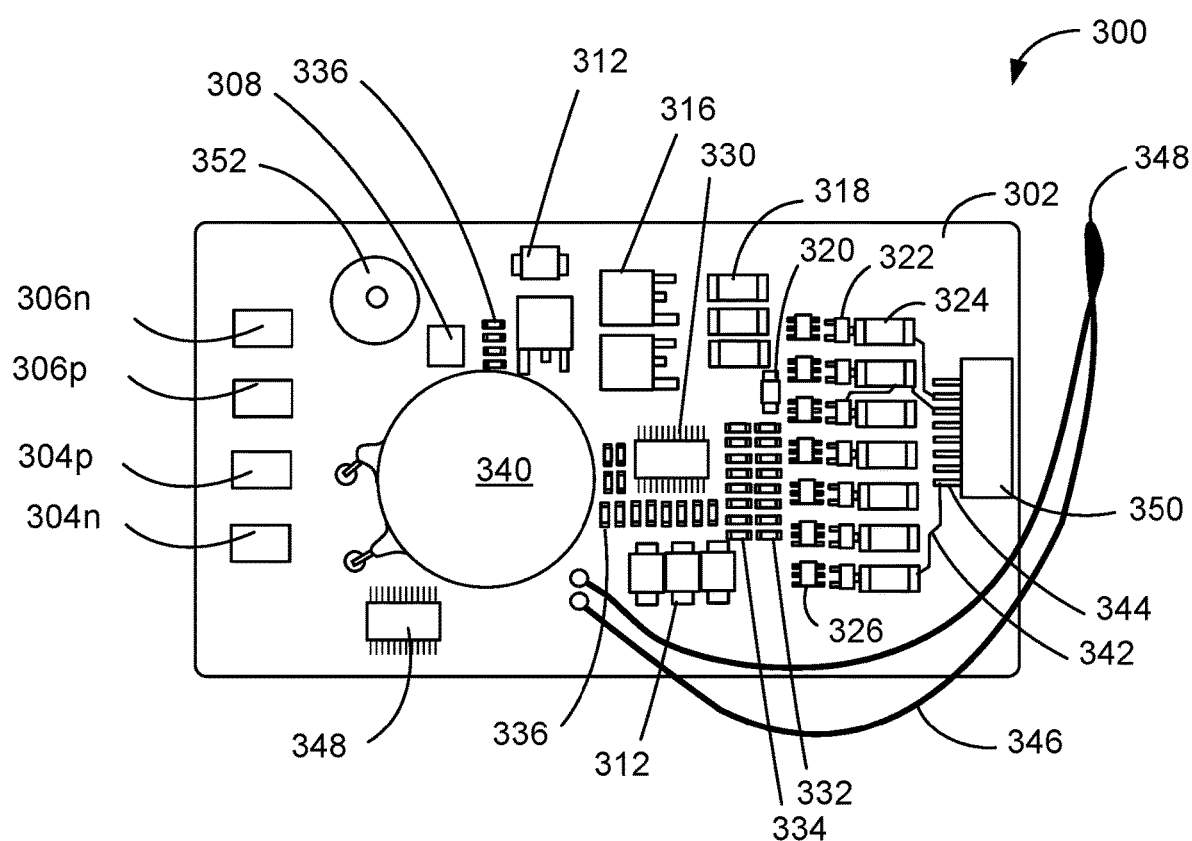
FIG. 3A illustrates one side of an example regulatory motherboard, in accordance with some embodiments.

FIG. 3A illustrates a frontside view of example regulatory motherboard 300. Motherboard 300 is responsible for monitoring and regulating the charging and discharging of the cells. In addition, motherboard 300 is responsible for most of the functions of battery pack 100. Further, motherboard 300 is also responsible for the safety of battery pack 100 because polymer cells contain dangerous substances and charging them with electricity or discharging them, if done incorrectly, can lead to disastrous consequences. In some embodiments, motherboard 300 can comprise a printed circuit board (PCB) motherboard. Motherboard 300 includes a non-conductive base 302 and trace wires 342 printed on base 302 that make up the circuit of motherboard 300.

According to various embodiments, motherboard 300 includes processor 330 for performing all the board's functions. Processor 330 acts as the brain of the board. It is a programmable chip programmed to work with all of the battery pack functions, charging, discharging, safety regulation, balancing of the cells individually as well as a pack, monitoring the temperature, LED light display and function, and communicates with Bluetooth processor 348. Processor 330 basically controls all functions of motherboard 330 and works with all the elements described below to implement the functions of battery pack 100. The elements described below, with the exception of processors, are simply elements that assist processor 330 with the functions described attributed to the elements. In addition, even the other processors, 348 and 308, are in communication and work with processor 330. In some embodiments, processor 330 is responsible for turning off the output when the battery pack is charging. In some embodiments, this may be important because the batteries are more volatile as they are charging. Thus, turning off usage while the battery is charging is safer.

In some embodiments, on one side of motherboard 300 sits four wire connection points 306n, 306p, 304p, and 304n. These connection points electrically connect current wires 106n, 106p, 104p, and 104n to motherboard 300. In some embodiments, the connection points are soldering points because the wires are soldered onto the motherboard. In some embodiments, the connection points are welding points, because the wires are welded, via either tack welding or spot welding, to motherboard 300. In some embodiments, if the wires are soldered, then an extra protective layer comprising an insulating material, such as silicone or rubber cement, should be applied to the solder points to prevent solder balls from moving, thereby immobilizing them and preventing them from becoming a potential hazard or shorting the circuit. In some embodiments, welding is preferred because of the possibility of solder balls forming during soldering. As described herein, any connection points disclosed can be done with either soldering or welding, depending on preference.

In some embodiments, motherboard 300 regulates the even charging and discharging of the polymer cells. It does this by monitoring cell performances relative the whole and then limiting other cells to match with the lowest performing cell. The polymer cells connect to charging motherboard 400 which then connects the cells to motherboard 300 via a plurality of wires 118. In this example, the plurality includes seven wires corresponding to each of the seven cells 200. Wires 118 electrically connect the cells to motherboard 300 via junction 350. In some embodiments, junction 350 includes connection points 344 for connecting the wires to motherboard 300. Connection points 344 are then connected to a plurality of resistor chips 324. Resistor chips 324 are responsible for balancing the input of power for each cell by limiting the amount of current in the circuit and defuse current from diodes 322. Diodes 322 stabilize the current and limits fluctuations and temperature stability. In some embodiments, if a cell has reached full charge, diodes 322 also reroutes the current to resistor chips 324 and defuses the current overall. In some embodiments, voltage regulators 326 are responsible for ensuring that each cell is regulated to be within 3.3-3.7 volts. Voltage regulators 326 also monitor the charging of each cell. Resistor chips 324, diodes 322, and voltage regulators 326 work together with processor 308 to monitor and regulate the balance of charge within the cells. Processor 308 ensures that input into the cells is the same, thus allowing for multi-cell units to function properly. In some embodiments, one mechanism for how processor 308 works is by first allowing current to go directly from voltage regulators 326 to junction 350 to charge the cells. After the cells becomes fully charged, processor 308 diverts the current to diodes 322 which then goes into resistors 324, where the current stops or dissipates. In some embodiments, each row of elements 326, 322, and 324 is individually capable of being shut off by processor 308. In some embodiments, processor 308 works with processor 330 to accomplish the charge monitoring.

In some embodiments, motherboard 300 also includes diodes 312, which are responsible for transient voltage suppression, via processor 330. Diodes 312 provide circuit protection by regulating against spikes in current charging and discharging. In some embodiments, motherboard 300 also includes resistors 332 for regulating wattage in the circuit and capacitors 334 for regulating voltage in the circuit, via processor 330. In addition, motherboard 300 can also include a plurality of resistors and capacitors 336 as extra layers of protection against failure.

In some embodiments, one major function of motherboard 300 is safety with regard to overheating. Safety is important because over usage can lead to overheating, which can lead to melting of important electrical parts, which would mean irreparable damage, as well as a fire hazard around dangerous chemicals in the polymer cells. Thus, in some embodiments, there are many safety mechanisms on motherboard 300 that work with processor 330 to ensure that the battery does not overheat and experience a thermal event. For example, transistor switches 316 are heavy duty switches that monitor the flow of power in and out of the plurality of cells. Resistor chips 318 act as current sensors and regulate the circuit to make sure the cells do not overcharge. Negative temperature coefficient (NTC) thermometer 346 also helps with safety regulation. NTC 346 wraps around and rests on the entire plurality of cells and physically monitors the heat. In some embodiments, NTC 346 includes a thermometer tip that is dipped in plastic to prevent moisture. In some embodiments, NTC 346 monitors the temperature to make sure it does not past a threshold temperature (e.g., 35 degrees Celsius). If the temperature passes the threshold, thermometer 346 increases resistance and alerts processor 330 to shut off the battery. In some embodiments, motherboard 300 also includes positive temperature coefficient (PTC) thermistor 340. PTC 340 also changes the resistance of the current and is used to determine if the circuit is too hot or too cold. The resistance in PTC 340 increases with heat, thereby slowing the current down. As temperature decreases, PTC 340 decreases resistance in the circuit, to increase current. Both PTC 340 and NTC 346 regulate current based on temperature. The difference is that they do it with opposite charges.

In some embodiments, motherboard 300 also includes diodes 320 for communicating, via processor 330, the remaining power left in the battery pack to LED lights 108. If the remaining power drops below a predetermined threshold, e.g. 10%, then diode 320 informs processor 330 to engage buzzer 352. Buzzer 352 emits a sound every time a user engages with the motorized furniture. In some embodiments, the sound is a single quick beep/chirp, a series of beeps or chirps, or a prolonged beep/chirp.

In some embodiments, motherboard 300 also includes Bluetooth processor 348. Bluetooth processor 348 works with processor 330 to shut off output from the battery. This eliminates the problem of a constant power draw (a passive draw of around 37 milliAmps) from the battery even when the motors are not in use. While Bluetooth processor 348 itself will still have a small constant current (a passive draw of only around 14 microAmps), Bluetooth processor 348 essentially allows a user, via a mobile device, to be able to turn off the output almost completely for the battery. In addition, Bluetooth processor 348 will be able to tell a user what the remaining power is within the battery and allow the user to set an alert when the battery reaches a minimum threshold (e.g., 25%) to remind the user to recharge the battery. Last, in some embodiments, Bluetooth processor 348 is further configured to be able to tell how much time had passed since the last recharge.

Figure 3B:
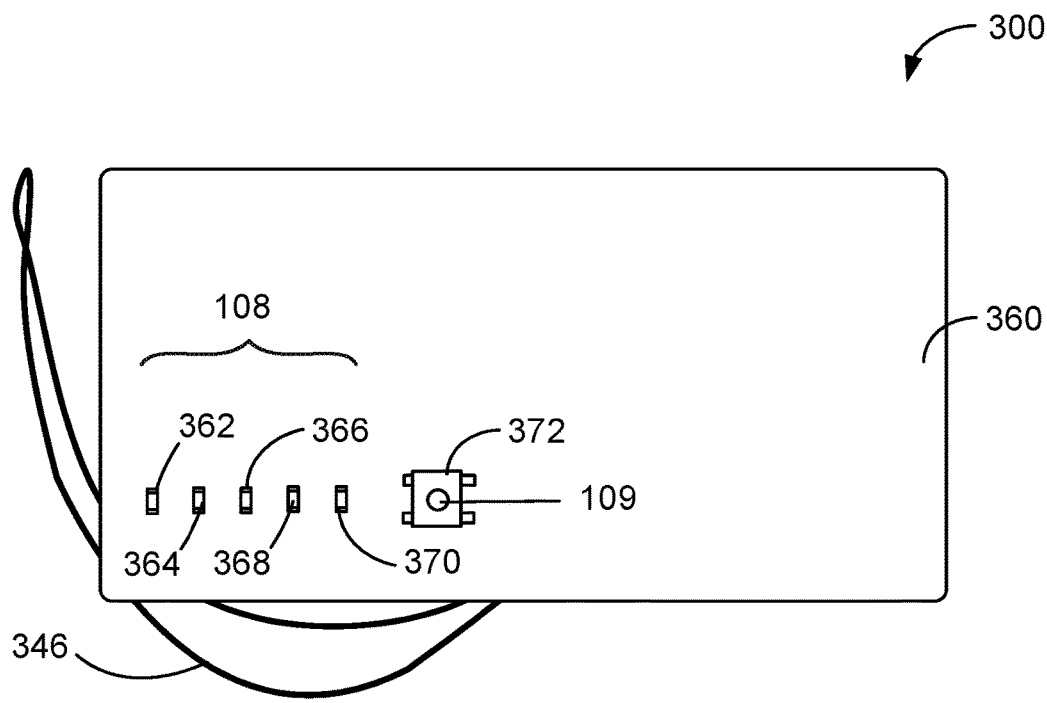
FIG. 3B illustrates another side of an example regulatory motherboard, in accordance with some embodiments.

FIG. 3B illustrates a backside view of regulatory motherboard 300. In some embodiments, the backside has a base 360 which is different from base 302 because the backside base 360 has a different printed circuit on it. Backside 360 includes a switch 372 that includes power button 109 for turning on LED lights 108. In some embodiments, switch 372 can also put the battery pack in demo mode if pressed and held for a threshold number of seconds (e.g., 5 seconds). In some embodiments, demo mode engages buzzer 352 to beep every time a user engages with the furniture, rather than just beeping when the battery drops below a predetermined threshold.

In some embodiments, the backside of motherboard 300 also includes LED lights 108. In some embodiments, LED lights 108 include five separate LED lights. In some embodiments, four of the five LED lights 362, 364, 366, and 368 are green. In some embodiments, one of the LED lights 370 is red. One example of how LED lights 108 display a scale of battery life is as follows: LED light 362 turns on only when the battery is charged at 100%. LED light 364 turns on only when the battery is charged over 75%. LED light 366 turns on only when the battery is charged over 50%. LED light 368 turns on only when the battery is charged over 25%. Last, LED light 370 only turns on when the battery is charged under 25% but more than 0%. If the battery is charged under 25% but over 10%, LED light 370 will be a constant red. If the battery is charged under 10%, then LED light 370 will blink red. The previous example is just one example of how the lights can be configured to indicate battery life. Other configurations are also possible as long as the LED lights 108 can be turned on by power button 109 and show a scale indication of battery life.

Figure 4A:
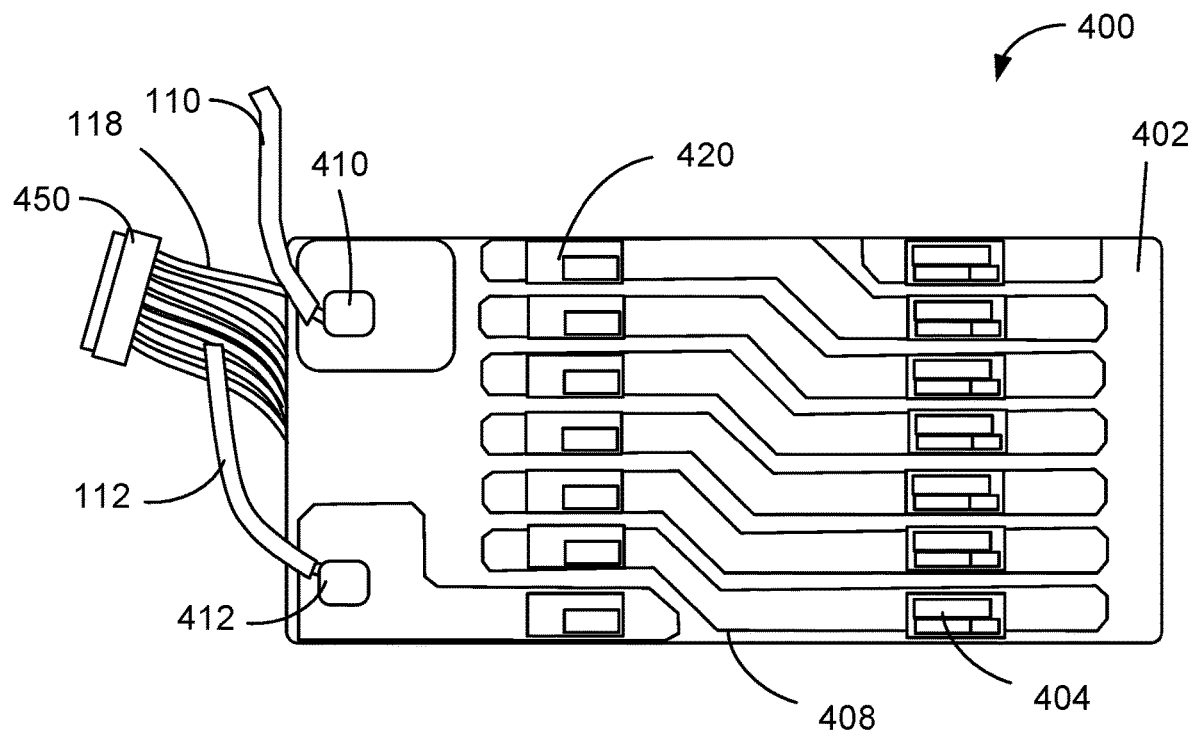
FIG. 4A illustrates one side of an example charging motherboard, in accordance with some embodiments.

FIG. 4A illustrates one side of an example charging motherboard 400. FIG. 4A represents the side where the welding, either by tack welding or spot welding, occurs. It is the side that is away from the plurality of cells 200 because welding needs to occur away from the cells to reduce the possibility of igniting the cells. Motherboard 400 includes a base 402, with trace wires 408, and a plurality of welding or connection slots 420 and 404. Each row of slots includes two slots, a slot for the positive pole of cell 200 and a slot for the negative pole of cell 200. Motherboard 400 also includes two connection points 410 and 412 to connect wires 110 and 112 to the motherboard. FIG. 4A also displays a connector 450 that leads the plurality of wires 118 into junction 350 of motherboard 300. Each individual cell connects to the motherboard 400, which then electrically connects the cells to motherboard 300.

Figure 4B:
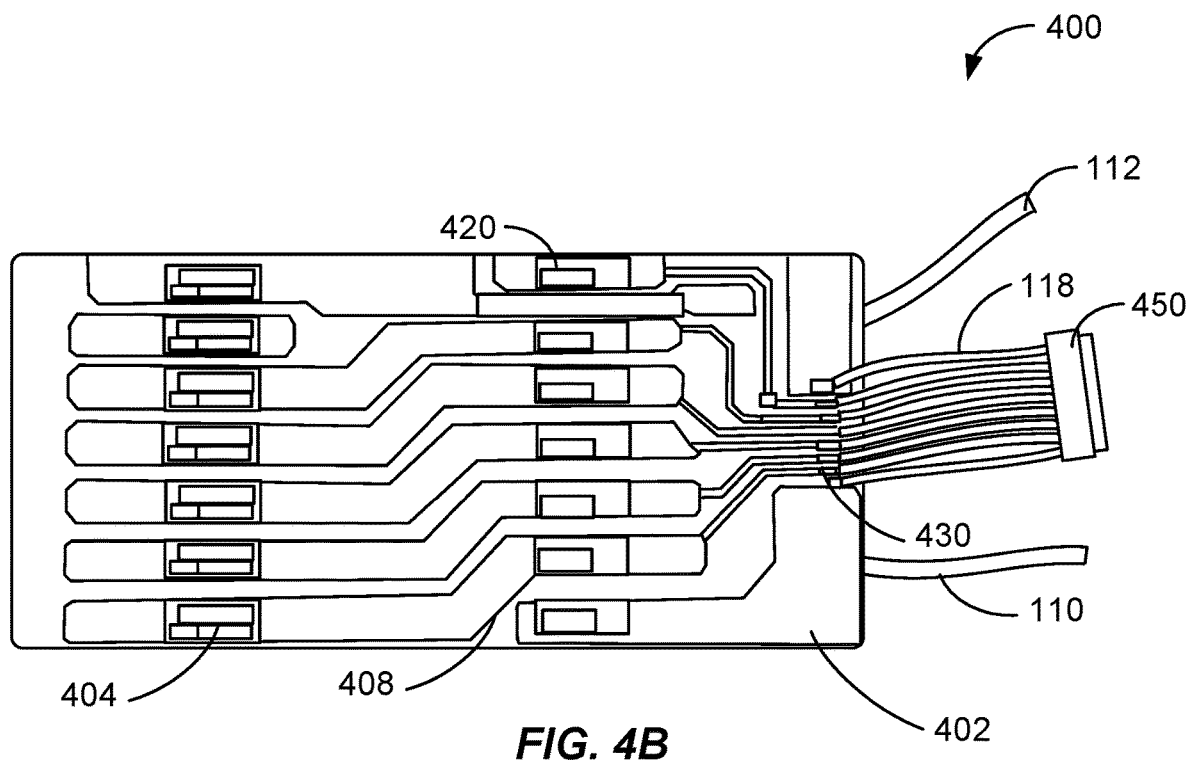
FIG. 4B illustrates another side of an example charging motherboard, in accordance with some embodiments.

FIG. 4B illustrates another side of charging motherboard 400. FIG. 4B illustrates the insertion side of the motherboard. Here, each cell 200 is inserted motherboard 400 by sticking the positive poles through one slot, either 404 or 420, and the negative pole in the other slot, and then welded on the other side shown in FIG. 4A. In some embodiments, the positive pole goes into 404 and the negative pole goes into 420. In other embodiments, the reverse occurs. The important thing is to note that each cell in the plurality of cells must be inserted into the motherboard in the exact same orientation. In other words, all positive poles have to go into the same side slot as each other and all negative poles have to go in the same side slot as each other. In some embodiments, the insertion side includes connection points 430 to be welded or soldered onto motherboard 400. It is important to note that both sides of motherboard 400, unlike motherboard 300, have the same base 402 and trace wires 408. This is because the slots need to be pass-through, so a single circuit is printed on the motherboard.

Figure 5A:
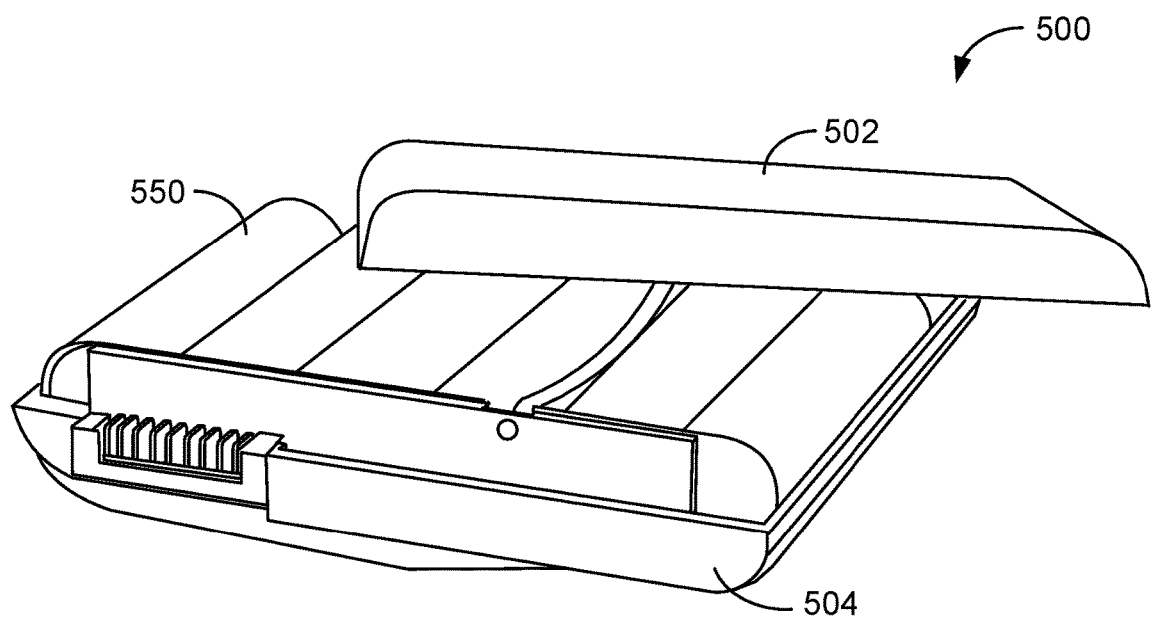
FIG. 5A illustrates an example industry standard batter pack, in accordance with some embodiments.
Figure 5B:
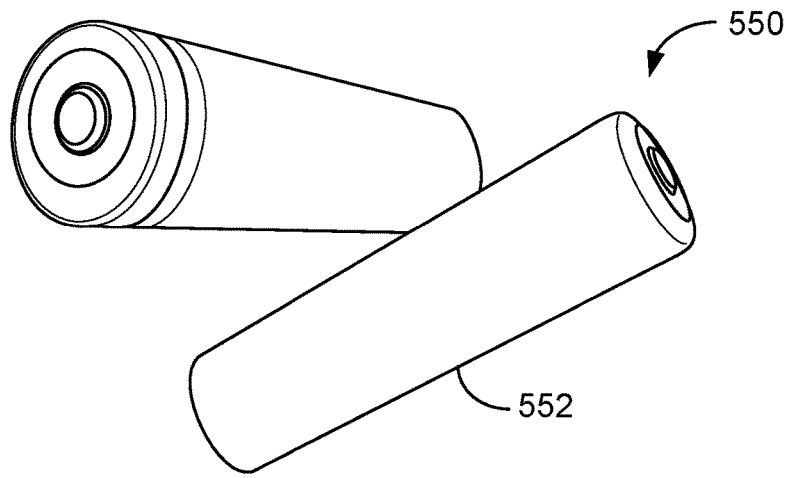
FIG. 5B illustrates an example industry standard battery cell, in accordance with some embodiments.

FIG. 5A illustrates an example industry standard batter pack. The industry standard battery pack 500 usually includes a front cover 502, a back cover 504, and batteries 550. FIG. 5B illustrates an example industry standard battery cell 550. Standard industry battery cell 550 usually has a tubular shaped body 552, similar to standard batteries used in a wide variety of electronics.

Figure 6:
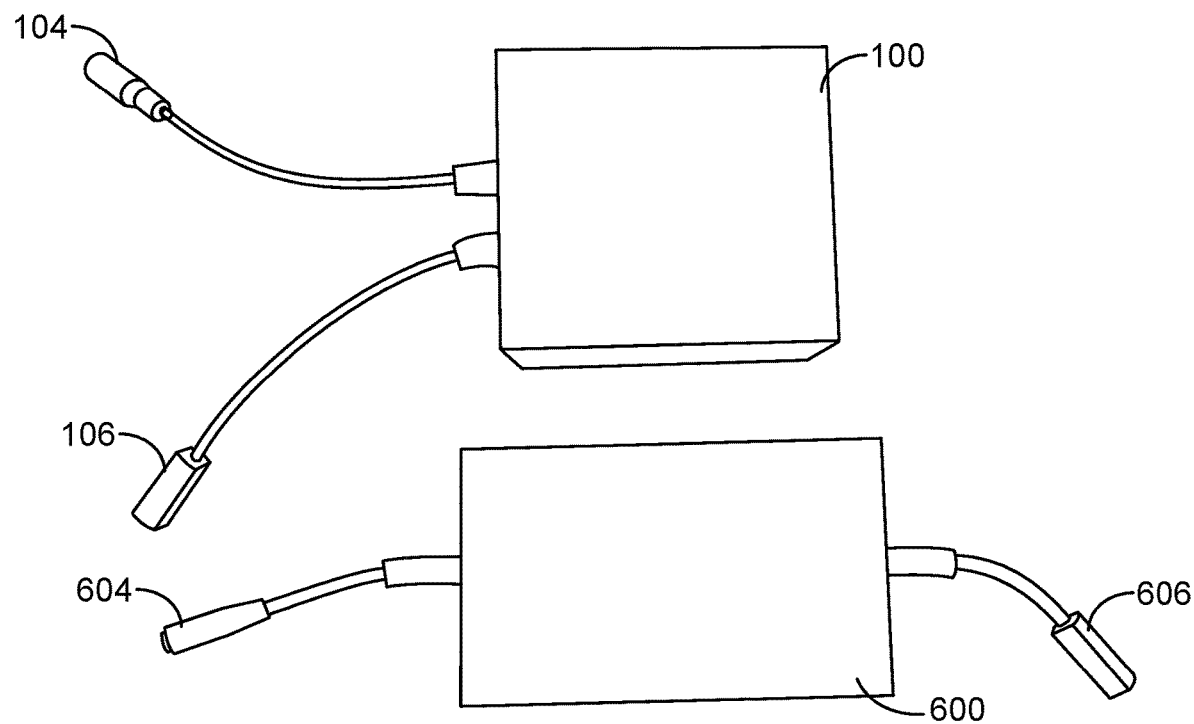
FIG. 6 illustrates an example comparison of an improved battery pack and a standard battery pack, in accordance with some embodiments.

FIG. 6 illustrates an example comparison of an improved battery pack and a standard battery pack, in accordance with some embodiments. FIG. 6 depicts a 6000 mAh battery pack 100, in accordance with some embodiments, juxtaposed next to a standard industry 1300 mAh battery pack for furniture. As a point of comparison, 6000 mAh battery pack is 605.22 cm$^3$, while the 1300 mAh standard industry battery pack is 554.62 cm$^3$. Thus, for relatively the same size, the 6000 mAh battery pack disclosed herein provides 4.6× the amount of capacity. As another point of comparison, a 6000 mAh standard industry battery pack would have to be 2,566.13 cm$^3$, which is 424% bigger than the 6000 mAh battery pack disclosed herein.

In some embodiments, both the charging cable 104 and 106 are located on the same side on battery pack 400, while the charging cable 604 is on the opposite side of output cable 606 on battery pack 600. This allows for an even greater reduction in space.

Figure 7A:
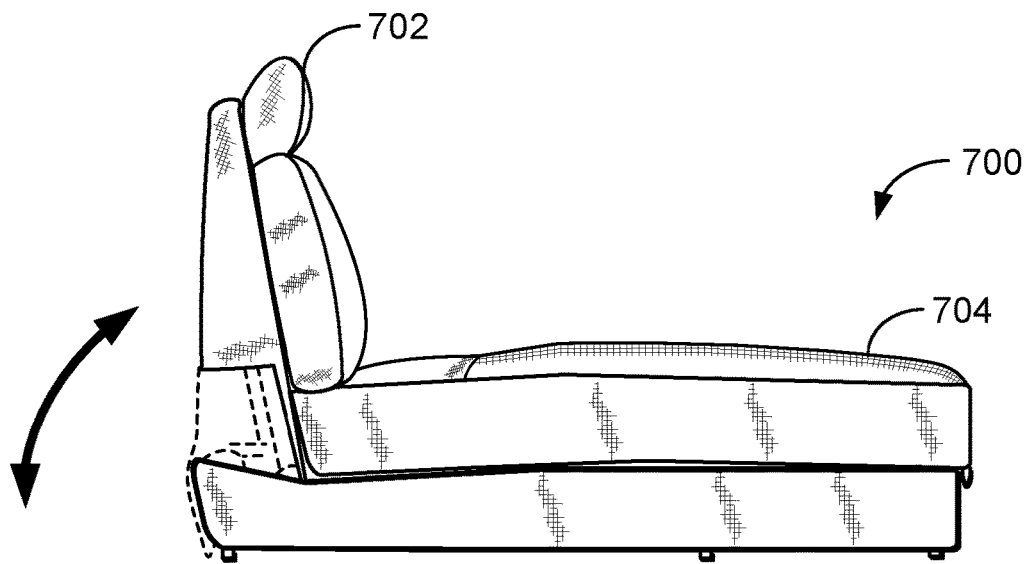
FIGS. 7A-7C illustrate an example of motorized furniture functions, in accordance with some embodiments.
Figure 7B:
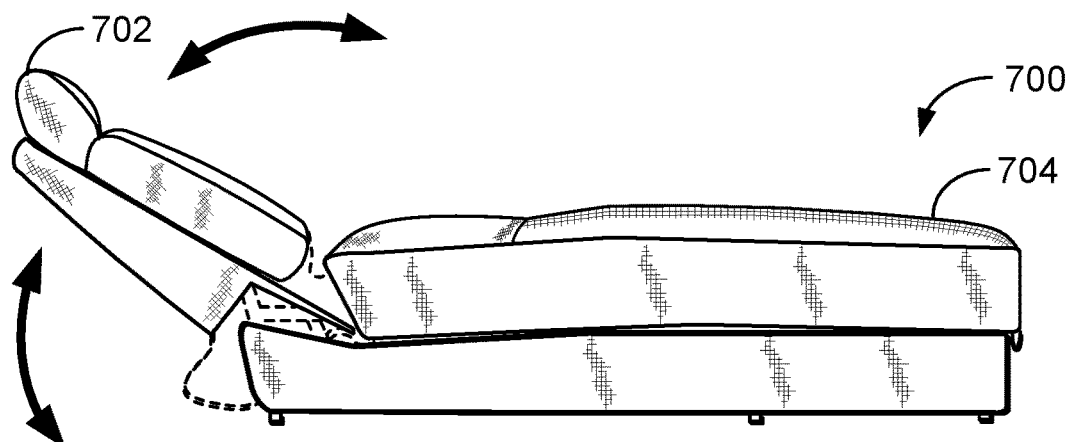
Figure 7C:
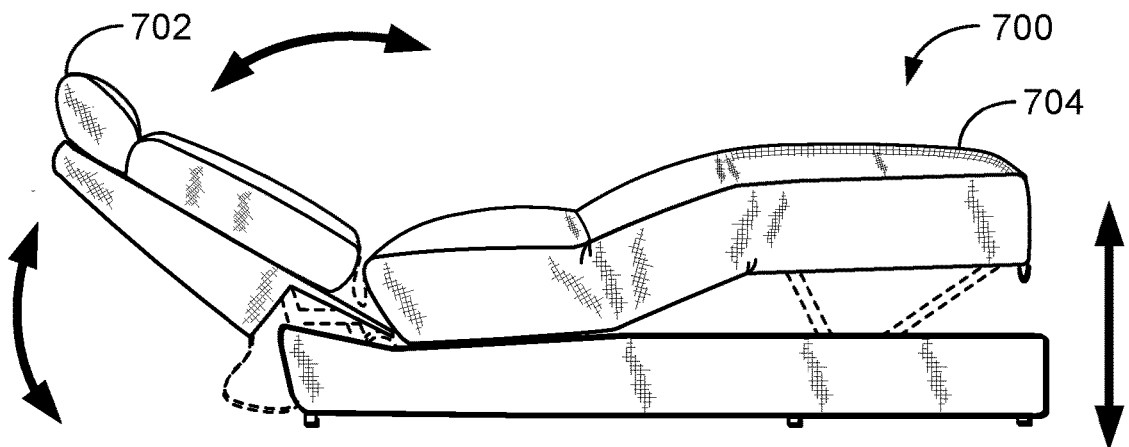

FIGS. 7A-7C illustrate an example of motorized furniture functions, in accordance with some embodiments. In some embodiments, battery pack 100 can be used to power motorized furniture 700. FIG. 7A shows motorized movement in the backrest 702, which allows the backrest to recline, as shown in FIG. 7B. FIG. 7C shows motorized function in the leg rest, allowing the leg rest to elevate into a zero gravity position.

Figure 8:
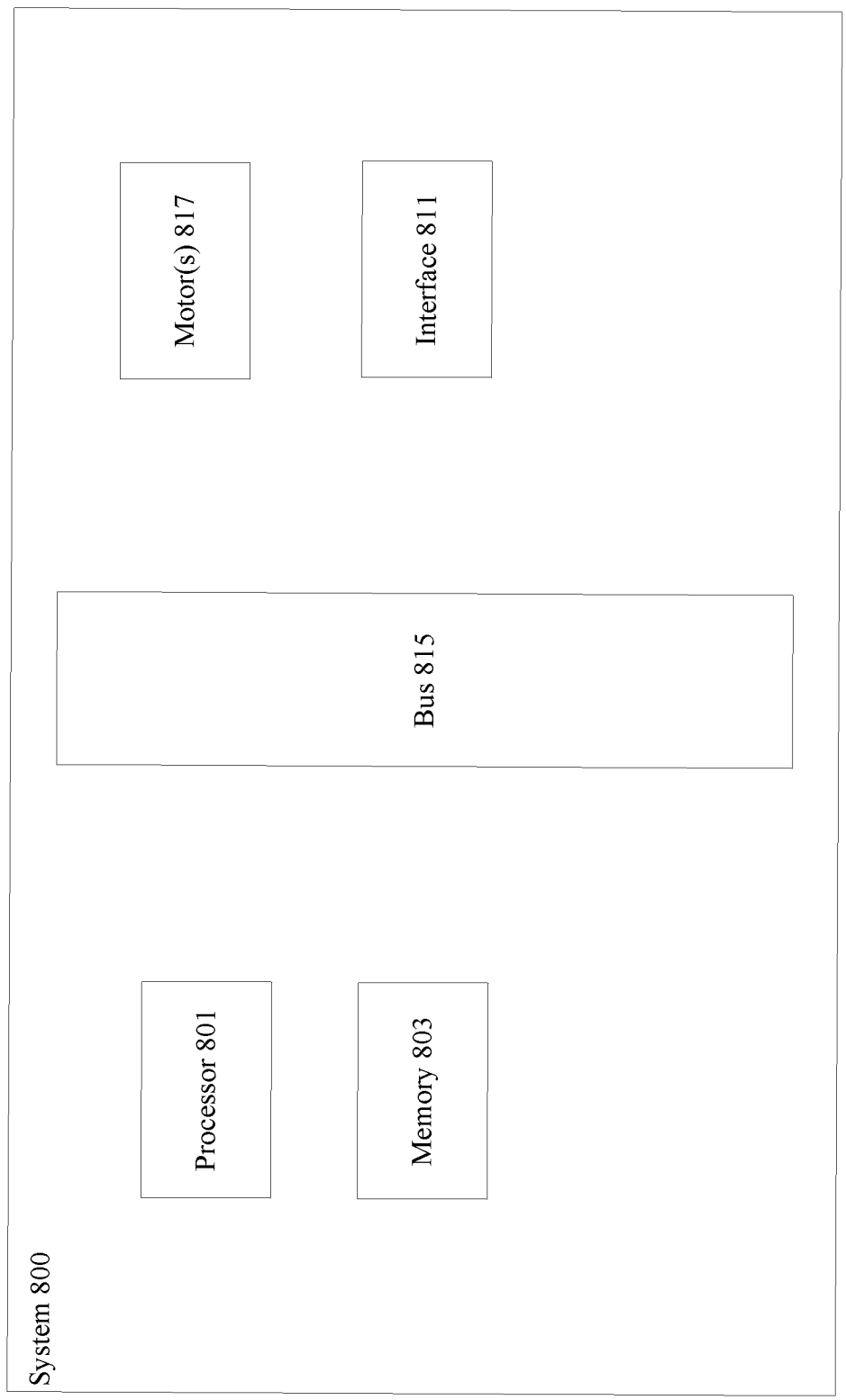
FIG. 8 illustrates an example computer system, in accordance with some embodiments.

FIG. 8 illustrates one example of an electronic system, in accordance with some embodiments. According to particular embodiments, a system 800 suitable for implementing particular embodiments of the present disclosure includes a processor 801, a memory 803, an interface 811, and a bus 815 (e.g., a PCI bus or other interconnection fabric) and operates battery packs and/or furniture. When acting under the control of appropriate software or firmware, the processor 801 is responsible for implementing applications for regulating battery levels, operating motorized functions, and interacting with a user. Various specially configured devices can also be used in place of a processor 801 or in addition to processor 801. The interface 811 is typically configured to send and receive data packets or data segments over a network or through a wireless connection, such as Bluetooth. System 800 can also include one or more motors 817 electrically connected to processor 801 for moving pieces of furniture.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 800 is an electronic system configured to regulate a battery pack, operate furniture, or some combination of both. The electronic system may include one or more hardware elements as shown in FIG. 8. In some implementations, one or more of the electronic system components may be virtualized. For example, parts of a physical electronic system may be configured in a localized or cloud environment. Although a particular electronic system is described, it should be recognized that a variety of alternative configurations are possible. For example, the modules may be implemented on another device connected to the electronic system.

The battery packs presented in the present disclosure provide many benefits over the current art. For example, the battery packs disclosed herein are extremely small in relation to the current technology available. In addition, they can run up to 6 motors, while industry standards will only run up to 2 without bogging and stoppage. Further, the custom motherboard allows the use of connected polymer cells, thereby reducing the volume in a 1300 mAh battery from the industry standard 554.62 cm$^3$ to 219 cm$^3$. In addition, the scale LED allows a user to see the volume of power remaining in the battery, which is not currently available in furniture battery packs. In some embodiments, the buzzer notifies the user upon interaction with motor the battery level is 10% or less and needs to be recharged. In some embodiments, the Bluetooth processor allows a user to turn off the battery pack output, thereby reducing the constant power draw from the battery even when the motorized furniture is not in use and prolonging the life of the battery pack. Last, the battery packs have the capability to disable the output cable while the battery pack is charging. The increases safety and the life of the battery pack.

While the present disclosure has been particularly shown and described with reference to specific embodiments thereof, it will be understood by those skilled in the art that changes in the form and details of the disclosed embodiments may be made without departing from the spirit or scope of the present disclosure. It is therefore intended that the present disclosure be interpreted to include all variations and equivalents that fall within the true spirit and scope of the present disclosure. Although many of the components and processes are described above in the singular for convenience, it will be appreciated by one of skill in the art that multiple components and repeated processes can also be used to practice the techniques of the present disclosure.

What is claimed is:

1. A battery pack to be used in motorized furniture, the battery pack including:
    a plurality of polymer cells, the plurality of polymer cells connected such that a threshold voltage is achieved; and
    a battery regulating mechanism coupled to the plurality of polymer cells, wherein the battery regulating mechanism is configured to alter charging and discharging of each cell in the plurality of polymer cells individually such that all cells in the plurality of polymer cells charge and discharge at the same rates.

2. The battery pack of claim 1, wherein the battery regulating mechanism is a motherboard.

3. The battery pack of claim 1, wherein the threshold voltage is 25.9 volts.

4. The battery pack of claim 1, wherein the plurality of polymer cells comprises exactly seven cells with a voltage of 3.7 volts each.

5. The battery pack of claim 1, wherein the plurality of polymer cells are configured to power two to six motors at the same time.

6. The battery pack of claim 1, further comprising a LED light configured to represent remaining power in the battery pack.

7. The battery pack of claim 1, further comprising a buzzer configured to notify a user that a battery level is 10% or less when the user activates a motor.

8. The battery pack of claim 1, further comprising a Bluetooth mechanism such that a user can turn off the battery pack output using a mobile device.

9. The battery pack of claim 1, wherein the battery pack is configured to be charged with a trickle charger.

10. The battery pack of claim 1, wherein the battery pack includes one of the following charge capacity to physical volume ratios: 1) 2000 milliampere hours (mAh) to 337.83 cm$^3$, 2) 4000 mAh to 459.77 cm$^3$, or 3) 6000 mAh to 605.22 cm$^3$.

11. A motorized furniture system comprising:
    one or more furniture pieces;
    one or more motors configured to move portions of the one or more furniture pieces; and
    a battery pack, the battery pack comprising:
    a plurality of polymer cells, the plurality of polymer cells connected such that a threshold voltage is achieved; and
    a battery regulating mechanism coupled to the plurality of polymer cells, wherein the battery regulating mechanism is configured to alter charging and discharging of each cell in the plurality of polymer cells individually such that all cells in the plurality of polymer cells charge and discharge at the same rates.

12. The motorized furniture system of claim 11, wherein the battery regulating mechanism is a motherboard.

13. The motorized furniture system of claim 11, wherein the threshold voltage is 25.9 volts.

14. The motorized furniture system of claim 11, wherein the plurality of polymer cells comprises exactly seven cells with a voltage of 3.7 volts each.

15. The motorized furniture system of claim 11, wherein the plurality of polymer cells are configured to power two to six motors at the same time.

16. The motorized furniture system of claim 11, further comprising a LED light configured to represent remaining power in the battery pack.

17. The motorized furniture system of claim 11, further comprising a buzzer configured to notify a user that battery level is 10% or less when the user activates a motor of the one or more motors.

18. The motorized furniture system of claim 11, wherein the battery pack further comprises a Bluetooth mechanism such that a user can turn off the battery pack output using a mobile device.

19. The motorized furniture system of claim 11, wherein the battery pack is configured to be charged with a trickle charger.

20. The motorized furniture system of claim 11, wherein the battery pack includes one of the following charge capacity to physical volume ratios: 1) 2000 milliampere hours (mAh) to 337.83 cm$^3$, 2) 4000 mAh to 459.77 cm$^3$, or 3) 6000 mAh to 605.22 cm$^3$.

* * * * *